United States Patent [19]

Whitaker

[11] 4,319,764
[45] Mar. 16, 1982

[54] MUD FLAP MOUNTING DEVICE FOR TRUCKS AND TRAILERS

[76] Inventor: Gene C. Whitaker, P.O. Box 627, Wilbur, Oreg. 97494

[21] Appl. No.: 98,534

[22] Filed: Nov. 29, 1979

[51] Int. Cl.³ .............................................. B62B 9/16
[52] U.S. Cl. ................................ 280/154; 248/475 B; 280/154.5 R; 362/64; 362/80
[58] Field of Search ............... 280/152 R, 153 R, 154, 280/154.5 R, 155, 159, 160, 656; 224/42.31; 180/311; 296/181; 362/64, 80, 61; 248/475 B, 549, 479, 278

[56] References Cited

U.S. PATENT DOCUMENTS

| 2,197,038 | 4/1940 | Glocksine et al. | 362/61 |
| 3,642,245 | 2/1972 | Wohnlich | 248/475 B |
| 3,746,366 | 7/1973 | Bruce et al. | 280/154.4 R |
| 3,848,842 | 11/1974 | Jepsen | 280/154.5 R X |
| 4,189,165 | 2/1980 | Leonard et al. | 280/154.5 R |

FOREIGN PATENT DOCUMENTS 162882  4/1958  Sweden .................................. 362/80

Primary Examiner—Joseph F. Peters, Jr.
Assistant Examiner—Donald W. Underwood
Attorney, Agent, or Firm—Chernoff & Vilhauer

[57] ABSTRACT

A mud flap mounting device for a vehicle such as a truck or trailer comprising a laterally extending tubular swing arm which is pivotably attached to a structural member of the truck or trailer, wherein the pivotable attachment adjustably provides frictional resistance to rotation of the swing arm but allows rotation in a direction generally forward relative to the vehicle once a predetermined amount of torque is applied to said swing arm. A positive stop prevents the swing arm from rotating rearward beyond a predetermined position in which the swing arm supports a mud flap in a desired location relative to the wheels of the vehicle. Horizontal flanges fixedly attached to a structural portion of the truck or trailer frictionally engage ears located on the forward side of the inner end of the swing arm to provide frictional resistance to rotation, while bolts extending through holes in the flanges and ears provide a pivot axis and adjustably control the frictional resistance to rotation of the swing arm. Signal lights may be protectively housed within the swing arm.

1 Claim, 4 Drawing Figures

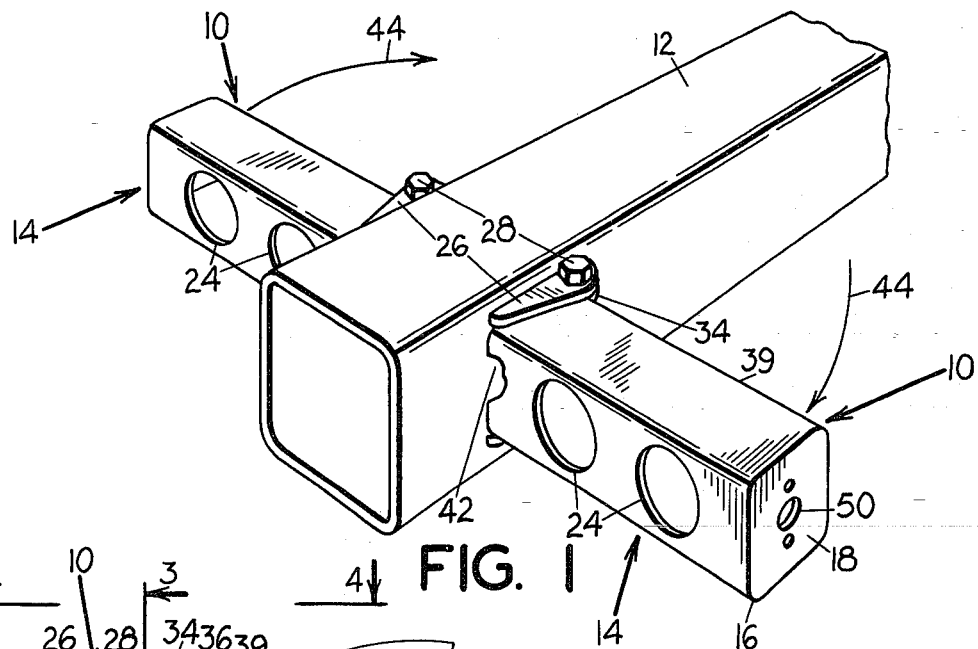
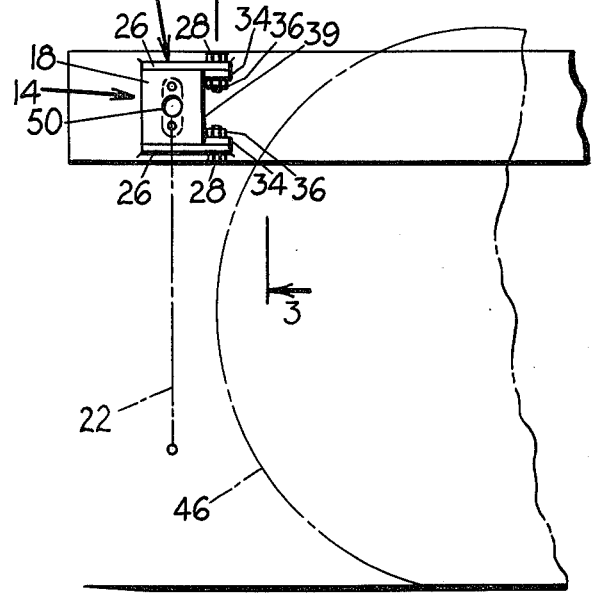
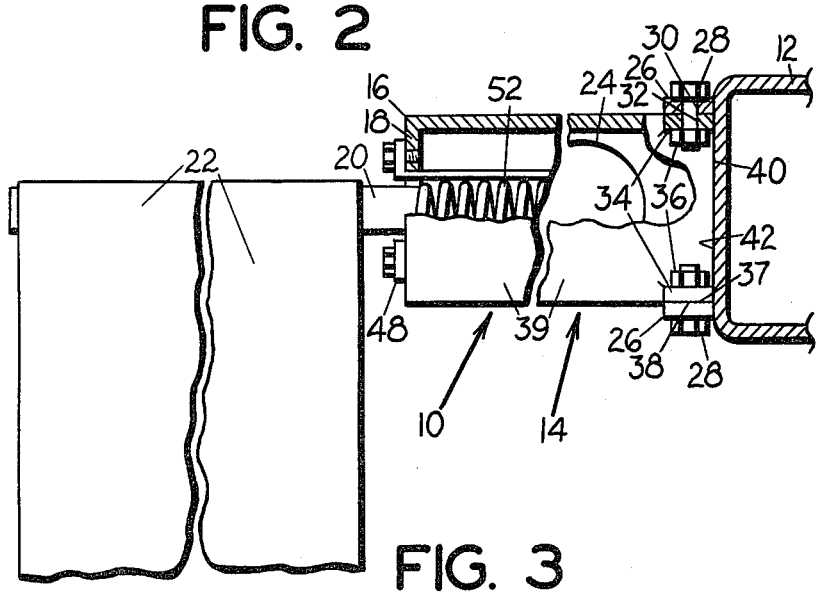
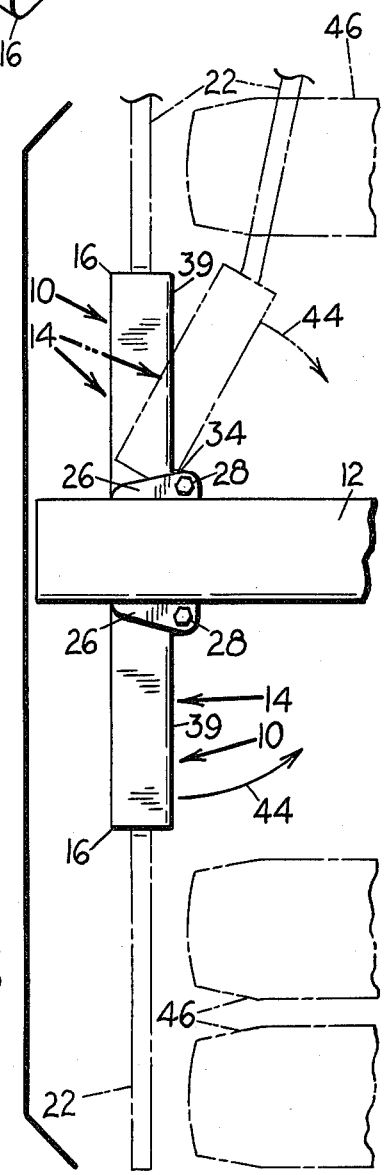
FIG. 1
FIG. 2
FIG. 3
FIG. 4

MUD FLAP MOUNTING DEVICE FOR TRUCKS AND TRAILERS

BACKGROUND OF THE INVENTION

The present invention relates to mounting devices for attaching mud flaps to vehicles, and particularly to a mounting device which is resistant to damage in case the truck or trailer on which the mud flaps are mounted is accidently backed into an obstruction.

Trucks are usually required by law to be equipped with mud flaps behind their rear wheels if they are to be operated on a highway. In vehicles such as log trucks and the like in which the truck bed or trailer bed is primarily only a skeletal frame without a solid load-carrying platform extending above the rear wheels, these mud flaps must be mounted on a horizontally extending support attached to a portion of the vehicle frame.

Particularly in the log hauling industry, where log trucks and trailers operate over hazardous and sometimes upredictable terrain and around obstructions such as log piles, loaders, and log decks, there is a high risk of such horizontally extending mud flap mountings being damaged. For example, when a truck or trailer is backing in a log handling yard, the mud flap mounting is typically the first part of the truck which encounters any obstruction which is not high enough to be clearly seen from the truck cab.

The logging industry currently primarily uses a solidly mounted mud flap support arm which extends laterally from a solid portion of the truck or trailer frame. A flexible mud flap-carrying wand is attached to this solid support arm. This permits the mud flap to move somewhat relative to the solid support arm, so that it can be deflected when it comes into contact with such roadside obstacles as fenceposts, bushes, and the like, without being damaged. The solid support arm is usually exposed to striking an obstacle only as the vehicle is backed, but in that case, upon contact with a solid obstacle, it usually breaks or bends. Breaking and bending of the solid support arms on vehicles such as log trailers require considerable maintenance, incurring repair costs and causing lost time to the operator of the vehicle.

In addition to mud flaps, such lighting fixtures as tail lights, brake lights, and turning signal lights are also mounted at the rear of trucks and trailers, where they are similarly vulnerable to damage when the truck or trailer is backed into an obstruction which may not be visible to the operator of the truck. They are commonly mounted in recesses defined in the solid mud flap hanger support arms, but are usually damaged when the hanger bracket is bent or broken off.

What is needed, therefore, is a device for use on vehicles such as log trucks and trailers to hold mud flaps securely in a desired location relative to the wheel of the vehicle during normal operation, which is not susceptible to damage in case the vehicle is backed into an obstruction. Ideally, such a device should be easily adjustable or replaceable and should also provide added protection for various light fixtures at the rear of a vehicle.

SUMMARY OF THE INVENTION

The present invention overcomes the aforementioned shortcomings and disadvantages of the previously used solid mud flap hanger support arms for trucks and trailers by providing an improved mounting device for supporting mud flaps, wherein a laterally extending horizontal swing arm is pivotably mounted on a longitudinal structural member of the truck or trailer so as to permit forward movement of the laterally extending member in response to a sufficiently great force, such as might be encountered if the vehicle is backed into an obstruction. On the other hand, a positive stop is provided to prevent the horizontal swing arm from being swung rearwardly from its normal position in which the mud flaps are supported in proper relationship to the wheels of the vehicle.

In the mud flap mounting device of the invention a preferably tubular, laterally extending, horizontal swing arm of generally rectangular cross-section includes a pair of ears having horizontal surfaces located on the forward side of the swing arm, at its inner end, which is fastened to the vehicle. The inner end is shaped to fit against the vehicle so that the swing arm extends generally perpendicular to the length of the vehicle. Horizontal flanges are fastened to a suitable structural member of the vehicle itself, for instance by welding, and are spaced vertically apart from one another by a distance corresponding to the separation between the uppermost and lowermost surfaces of the ears on the horizontal swing arm, and the swing arm is located between the flanges.

A pivotable, adjustable torque-responsive connection hold the ears of the horizontal swing arm to the flanges attached to the vehicle, preventing movement of the horizontal swing arm without the application of at least a minimum amount of force tending to swing the horizontal swing arm forward with respect to the vehicle. This connection may be of any desired type, but a simple and workable type of such connection comprises the use of a bolt and nut combination to hold each ear to the respective flange so as to create a frictional resistance to movement of the horizontal member relative to the flange.

A mud flap may be attached to the opposite, or outer, end of the horizontal member, which is preferably closed, and may include a suitable socket or mounting baseplate to accommodate the end of a horizontal supporting wand of a mud flap.

Openings may be defined in the rear side of the horizontal member to receive light fixtures of tail lights, brake lights and turning signal lights. The various light fixtures may then be mounted within the horizontal member, which provides protection of the light fixtures against damage from collison with an unseen object as the vehicle is backed.

The improved mounting device of the present invention thus holds mud flaps as securely and fixedly as a solidly welded support arm during normal conditions, when the vehicle is moving forward, yet because of the adjustable torque-responsive pivot joint, the horizontal swing arm of the present invention can swing forward, avoiding damage, should the vehicle be backed into an object.

It is therefore a primary objective of the present invention to provide an improved mounting device for supporting mud flaps on vehicles such as log trucks and trailers.

It is another major objective of the present invention to provide a mounting device for mud flaps which is less susceptible to damage by accidental backing into an obstruction.

It is yet another objective of the present invention to provide improved protective mounting device for tail lights, turning signal lights, and mud flaps on the rear of a vehicle such as a log truck or trailer which has only a skeletal chassis.

It is a primary feature of the present invention that a tubular, laterally extending, horizontal swing arm provides a protective mounting position for lamps and support for mud flaps on a truck, trailer, or similar vehicle, allowing such lamps to move, escaping damage should the vehicle encounter an obstruction while backing.

It is another feature of the present invention that it provides a mud flap mounting device for use on trucks and trailers which is hinged to swing forward in case the truck or trailer backs into an obstruction.

It is another feature of the present invention that it provides adjustable and resettable frictional means for holding a horizontal swing arm of a mud flap mounting device in a laterally extended position, permitting forward movement of the horizontal swing arm upon application of sufficient force without damage to the mud flap mounting device, but preventing rearward movement beyond a predetermined position.

It is an important advantage of the present invention that it provides a mud flap mounting device for trucks and trailers which provides reduced repair and maintenance costs and reduced amounts of time lost during accomplishment of repairs.

It is an additional advantage of the present invention that it provides an improved protective mounting position for tail lights, brake lights, and turning signal lights on a vehicle having a skeletal chassis but no protective body members.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a pictorial view of a rear end portion of a log trailer on which a pair of mud flap mounting devices which embody the present invention are attached to the reach.

FIG. 2 is a side elevational view of a rear portion of a truck equipped with the mud flap mounting devices of FIG. 1, with mud flaps attached thereto.

FIG. 3 is a partially sectional, partially cut away view, at an enlarged scale, of the mud flap mounting device of the present invention, taken along line 3—3 of FIG. 2.

FIG. 4 is a top view of the rear portion of the truck and mud flap mounting devices shown in FIG. 2, taken along line 4—4 of FIG. 2.

DETAILED DESCRIPTION OF THE INVENTION

Referring now to the drawings, a pair of mud flap mounting devices 10 embodying the present invention are shown pictorially in FIG. 1, attached to the rear end of the reach 12 of a log truck trailer. The mud flap mounting device 10 comprises an elongate horizontally oriented swing arm 14, which is preferably tubular and of a generally rectangular cross-section and extends generally transversely to the length of the vehicle. The swing arm 14 has a closed outer end 16 which includes an attachment baseplate 18 for a flexible wand 20, shown in FIGS. 2-4, to which the upper portion of a mud flap 22 is attached to prevent mud and stones from flying dangerously from the tires of the truck, trailer, or similar wheeled vehicle. A plurality of openings 24 are defined in the rear side of the swing arm 14 providing mounting positions for lamps such as tail lights, brake lights, and turning signal lights to protect the lamps from damage should the vehicle be accidentally backed into an obstruction.

Referring now also to FIGS. 2 and 3, it may be seen that a pair of flanges 26, which are fixedly attached to the reach 12, as by welding, extend horizontally along the reach 12 at the top and the bottom of the swing arm 14. A bolt 28 extends through a bore 30 in each of the flanges 26 into a bore 32 in the corresponding one of a pair of ears 34 located at the top and bottom, respectively, of the forward side of the swing arm 14, and a nut 36 is matingly threaded onto each of the bolts 28.

The spacing of the flanges 26 corresponds to the spacing of the ears 34 and to the height of the swing arm 14, so that the swing arm 14 fits snugly but movably between the flanges 26, with a rotatable frictional surface 37 of each ear 34 in contact with a fixed frictional surface 38 of the respective flange 26.

The bolts 28 are arranged coaxially, with one another providing a vertical pivot axis about which the swing arm 14 can rotate, and the location of the ears 34, on the forward side 39 of the swing arm 14, allows the swing arm to rotate forward toward the reach 12 of the truck. The inner end 40 of the swing arm 14, however, fits flush against an outer surface 42 of the side of the reach 12 or other longitudinal structural member of the vehicle to which the mud flap mounting device 10 is attached, preventing rotation of the swing arm 14 in a rearward direction. The respective nut 36 is normally tightened upon each of the bolts 28 sufficiently to bring the rotatable frictional surfaces 37 of the ears 34 into friction producing contact with the respective fixed frictional surfaces 38 of the horizontal flanges 26, to resist rotation of the swing arm 14 relative to the reach 12 of the truck or trailer.

Referring now also to FIGS. 3 and 4, it will be seen that the swing arm 14 will be rotated forward as indicated by the arrow 44 if sufficient torque is applied. As a result, the mud flap 22 is brought into contact with the rearward side of a tire 46 of the truck or trailer, but the swing arm 12 is short enough to swing forward without itself coming into contact with the tire 46. Should the swing arm 14 move forward, a flexible portion of the wand 20 of the mud flap 22 allows the mud flap 22 to move rearwardly with respect to the swing arm 14 so that the truck tires 46 may rotate despite the dislocation of the swing arm 14 from its normal laterally extending position.

Such a flexible wand 20 might typically be secured to the baseplate 18 in the outer end 16 of the mud flap mounting device by bolts extending through the baseplate 18 and the base 48 of the wand 20. An opening 50 in the baseplate 18 allows a helical spring 52 of the flexible wand to extend within the box-shaped tubular structure of the swing arm 14. This supports the flexible wand 20 normally in a horizontal laterally extending location, yet allows flexure of the wand as indicated in FIG. 3, should the swing arm 14 of the mud flap mounting device 10 be dislocated in a forward direction relative to the vehicle, as for instance by the mud flap mounting device 10 of the invention colliding with an obstruction as the vehicle is backing.

As may be seen particularly in FIG. 4, the mutually contacting frictional surfaces 37 and 38 of the ears 34 and the horizontal flanges 26 are perpendicular to the vertical axis of rotation of the swing arm 14 relative to the vehicle, permitting the amount of torque required to rotate the swing arm relative to the vehicle to be controlled by adjusting the tension in each of the bolts 28 and thereby adjusting the pressure exerted by the respective frictionally engaged surfaces 37 and 38 of the horizontal flanges 26 and the ears 34. When tension in the bolts 28 is properly adjusted, friction between the ears 34 and the flanges 26 is sufficient to hold the swing arm in its proper laterally extending position relative to the reach 12 of the vehicle, yet is small enough to permit the swing arm 14 to move forward rather than break or bend, if the vehicle is backed into an obstruction.

Once the swing arm 14 has been swung forward as a result of backing into an obstruction, it is only necessary to loosen the nuts 36 of the bolts 28, move the swing arm 14 to its normal position, and reset the proper frictional resistance to movement of the swing arm 14 by retightening the nuts 36 on the bolts 28.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A mounting device for supporting mud flaps on a vehicle such as a truck, comprising:
   (a) a swing arm, said swing arm extending generally horizontally and transverse to the length of said vehicle;
   (b) pivot means for permitting said swing arm to be freely rotated about a generally vertical pivot axis;
   (c) position limiting means for preventing rotation of said swing arm in a direction toward the rear of the vehicle beyond a position where said swing arm is substantially normal to the length of said vehicle;
   (d) torque responsive means for preventing rotation of said swing arm in a direction toward the front of the vehicle when less than a predetermined amount of torque is applied to said swing arm and allowing rotation when greater than said predetermined amount of torque is applied to said swing arm;
   (e) adjustment means associated with said torque responsive means for selectively adjusting the level of torque which must be applied to said swing arm to cause it to commence rotation;
   (f) means for attaching mud flaps to said swing arm; and
   (g) wherein said pivot means comprises a pair of horizontal flanges fixedly attached to and extending outwardly from said vehicle, said swing arm has an inner end and a forward side and a pair of horizontal ears located on said forward side, said ears extending between said horizontal flanges with a respective one of said ears adjacent to each of said horizontal flanges, said torque responsive means comprises coaxial vertically aligned bores defined in said flanges and said ears, and including a bolt extending through respective ones of said bores in at least one of said pair of flanges and the respective adjacent ear, and said position limiting means comprises locating said horizontal flanges, ears and bolts in a manner such that when said swing arm is positioned substantially normal to the length of the vehicle its inner end is located proximate the vehicle so that such swing arm and said vehicle will interact to prevent said swing arm from being rotated toward the rear of such vehicle.

* * * * *